United States Patent
Baba

(10) Patent No.: US 8,179,618 B2
(45) Date of Patent: May 15, 2012

(54) OPTICAL UNIT AND IMAGE PICKUP APPARATUS

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 12/959,602

(22) Filed: Dec. 3, 2010

(65) Prior Publication Data
US 2011/0157724 A1    Jun. 30, 2011

(30) Foreign Application Priority Data
Dec. 24, 2009   (JP) .................................. 2009-291916

(51) Int. Cl.
*G02B 9/60*    (2006.01)
*G02B 13/18*    (2006.01)

(52) U.S. Cl. ....................................... 359/763; 359/714

(58) Field of Classification Search .......... 359/763–770, 359/714
See application file for complete search history.

(56) References Cited

U.S. PATENT DOCUMENTS
5,161,060 A * 11/1992 Watz ............................. 359/642
2003/0218808 A1    11/2003 Sekita FOREIGN PATENT DOCUMENTS
JP    2003-329925    11/2003
* cited by examiner

*Primary Examiner* — Scott J Sugarman
(74) *Attorney, Agent, or Firm* — SNR Denton US LLP

(57) ABSTRACT

An optical unit includes a first lens, a second lens, a diaphragm, a third lens, a fourth lens, and a fifth lens, which are arranged in the stated order from an object side to an image plane side. The second lens has a convex shape. The third lens has a meniscus shape. The fourth lens has a convex shape. The fifth lens has a negative power.

12 Claims, 9 Drawing Sheets

111 : First lens
112 : Second lens
113 : Diaphragm
114 : Third lens
115 : Fourth lens
116 : Fifth lens 111 : First lens
112 : Second lens
113 : Diaphragm
114 : Third lens
115 : Fourth lens
116 : Fifth lens

OPTICAL UNIT AND IMAGE PICKUP APPARATUS

BACKGROUND OF THE INVENTION

1. Field of the Invention

The present invention relates to an optical unit applied to image pickup equipment and an image pickup apparatus.

2. Description of the Related Art

In recent years, image pickup equipment mounted on a mobile phone, a personal computer (PC), or the like has been asked to realize a high resolution, a low cost, and miniaturization.

An image sensor, such as a CCD (charge coupled device) and a CMOS (complementary metal oxide semiconductor) image sensor, has a remarkably reduced cell pitch. Thus, an optical system is required to have such a high image-forming performance that an optical aberration, particularly, an axial chromatic aberration is further suppressed as compared to a normal optical system.

There are now many cases where high-end models of mobile phones use an optical system with the structure of four elements in four groups.

With a recent increase in number of pixels, even the aforementioned structure provides inadequate performance.

In view of this, it is necessary to study the structure of five elements in five groups.

SUMMARY OF THE INVENTION

However, in an image pickup lens disclosed in Japanese Patent Application Laid-open No. 2003-329925 (hereinafter, referred to as Patent Document 1), fourth and fifth lenses are defined with positive power. Therefore, an optical path length is long. Further, Fno thereof is 3.9, which is dark.

In view of the above-mentioned circumstances, it is desirable to provide an optical unit that has optical characteristics that are equal to or greater than those of an existing unit, delivers brighter light, and can be downsized, and provide an image pickup apparatus.

According to an embodiment of the present invention, there is provided an optical unit including a first lens, a second lens, a diaphragm, a third lens, a fourth lens, and a fifth lens, which are arranged in the stated order from an object side to an image plane side. The second lens has a convex shape. The third lens has a meniscus shape. The fourth lens has a convex shape. The fifth lens has a negative power.

According to another embodiment of the present invention, there is provided an image pickup apparatus including an image pickup element and an optical unit to form an image of a subject on the image pickup element. The optical unit includes a first lens, a second lens having a convex shape, a diaphragm, a third lens having a meniscus shape, a fourth lens having a convex shape, and a fifth lens having a negative power, which are arranged in the stated order from an object side to an image plane side.

According to the embodiments of the present invention, such advantages are provided that the optical characteristics, which are equal to or greater than those of the existing unit, are provided, brighter light is delivered, and the downsizing can be realized.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the attached drawings.

It should be noted that the description will be given in the following order.

1. First embodiment (First structural example of image pickup lens that uses optical unit)
2. Second embodiment (Second structural example of image pickup lens that uses optical unit)
3. Third embodiment (Third structural example of image pickup lens that uses optical unit)
4. Fourth embodiment (Structural example of image pickup apparatus)

1. First Embodiment

Figure 1:
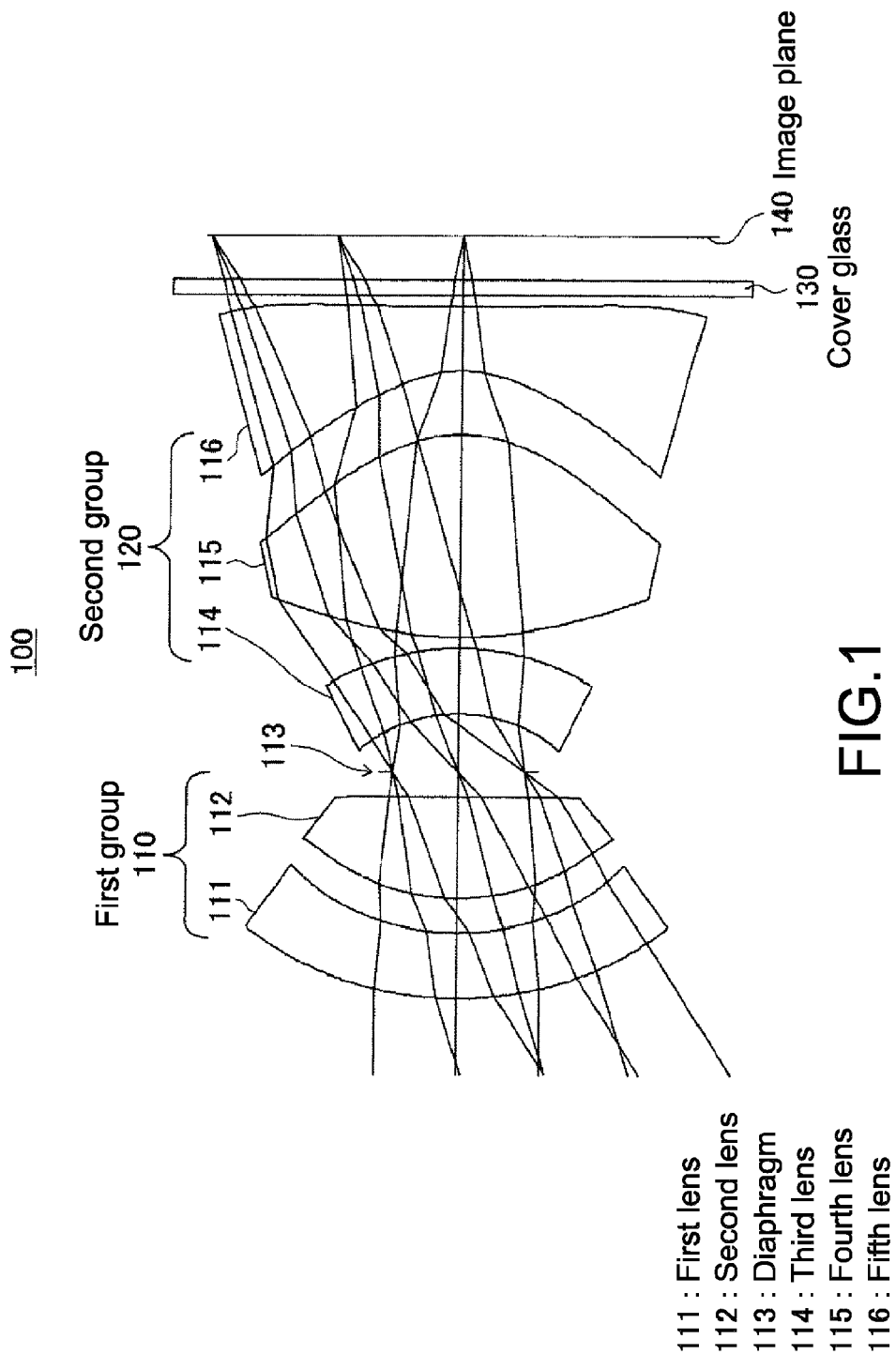
FIG. 1 is a diagram showing a structural example of an image pickup lens according to a first embodiment of the present invention.

FIG. 1 is a diagram showing a structural example of an image pickup lens that uses an optical unit according to a first embodiment of the present invention.

As shown in FIG. 1, an image pickup lens 100 according to the first embodiment includes a first lens 111, a second lens 112, a diaphragm 113, a third lens 114, a fourth lens 115, and a fifth lens 116 that are arranged in the stated order from an object side OBJS toward an image plane side.

The image pickup lens 100 further includes a cover glass 130 and an image plane 140.

The image pickup lens 100 is formed as a single focus lens.

Further, the optical unit can be defined by a first group 110 and a second group 120 with the diaphragm 113 sandwiched therebetween.

Specifically, the first group 110 is constituted of the first lens 111 and the second lens 112 that are arranged in the stated order from the object side OBJS toward the image plane 140 side.

The second group 120 is constituted of the third lens 114, the fourth lens 115, and the fifth lens 116 that are arranged in the stated order from the object side OBJS toward the image plane 140 side.

Further, in this embodiment, between the second lens 112 of the first group 110 and the third lens 114 of the second group 120, the diaphragm 113, e.g., an adjustable diaphragm is provided, for example.

In the image pickup lens 100 that is the single focus lens, it is assumed that an imaging area (image reception area) of a solid-state image sensor such as a CCD sensor and a CMOS sensor is disposed for the image plane 140.

The cover glass 130 is disposed between an image-plane-side surface of the fifth lens 116 and the image plane 140. Between the image-plane-side surface of the fifth lens 116 and the image plane 140, an infrared cutoff filter, a low-pass filter, the cover glass 130 made of a resin or glass, or an optical member may be disposed.

It should be noted that, in FIG. 1, the left side corresponds to the object side (front side) and the right side corresponds to the image plane side (rear side) in this embodiment.

A light flux that is incident on the object side is focused on the image plane 140.

Hereinafter, a description will be given on the structure and effect of the image pickup lens of this embodiment.

The image pickup lens 100 is constituted of the lenses with the structure of five elements in five groups.

The first lens 111 is formed of a negative meniscus lens having a convex surface that is convex toward the object side.

The second lens 112 is formed of a lens having an approximately convex shape.

The third lens 114 is formed of a negative meniscus lens having a convex shape that is convex toward the image plane side, and an Abbe number vL3 thereof is small.

The fourth lens 115 is formed of a convex-shaped lens, an Abbe number vL4 of which is large.

The fifth lens 116 is formed of a negative-power lens having an approximately concave shape, an Abbe number vL5 of which is small.

The first lens 111 and the second lens 112 constitute the first group 110, and the third lens 114, the fourth lens 115, and the fifth lens 116 constitute the second group 120.

The first group 110 produces an effect to shift a substantial pupil position toward the object side, because of the negative power of the first lens 111, and desirably corrects, in particular, an off-axis coma aberration and astigmatism in combination with the convex second lens 112.

The third lens 114 is bent with the concave surface thereof facing the diaphragm 113, and the center of a curvature radius of the surface is located in the vicinity of the diaphragm 113, thereby desirably correcting the coma aberration and the astigmatism.

In addition, the powers of the convex fourth lens 115 and the concave fifth lens 116 are significantly large. Therefore, a chromatic aberration, the astigmatism, and the coma aberration are strongly corrected, thereby providing a lens having Fno 2.4, which is bright.

Further, the image pickup lens 100 of this embodiment, which is the single focus lens, is configured so as to satisfy the following conditional expressions (1) to (10).

The image pickup lens 100 of this embodiment has characteristics of strongly correcting the chromatic aberration, the coma aberration, and astigmatism with the strongly convex fourth lens 115 and the strongly concave fifth lens 116, in particular.

In the conditional expression (1), which is related to the power of the fourth lens 115, when the lower limit is exceeded, the power becomes too strong, and the sensitivity to eccentricity or the like is deteriorated, which makes the manufacture impossible. Thus, the lower limit is determined.

When the upper limit is exceeded, it may become impossible to perform the aberration correction. Off-axis characteristics are deteriorated due to the coma aberration, in particular.

[Expression 1]

$$0.3 \leq f4/f \leq 10 \qquad (1)$$

where f represents a total focal length, and f4 represents a focal length of the fourth lens 115.

In the conditional expression (2), which is related to the power of the fifth lens 116, when the lower limit is exceeded, it may be impossible to perform the aberration correction. The off-axis characteristics are deteriorated due to the coma aberration, in particular.

When the upper limit is exceeded, the power becomes too strong, and the sensitivity to eccentricity is deteriorated, which makes the manufacture impossible.

[Expression 2]

$$-10 \leq f5/f \leq -0.3 \qquad (2)$$

where f represents the total focal length, and f5 represents a focal length of the fifth lens 116.

In the conditional expression (3), which is related to the power of the second lens 112, when the lower limit is exceeded, an off-axis coma aberration and astigmatism are subjected to overcorrection, which deteriorates the off-axis characteristics. Further, the power becomes strong, which deteriorates the sensitivity to eccentricity.

When the upper limit is exceeded, the power becomes weak, which makes the correction of the off-axis coma aberration and astigmatism impossible. As a result, the off-axis characteristics are deteriorated.

[Expression 3]

$$0.3 \leq f2/f \leq 10 \qquad (3)$$

where f represents the total focal length, and f2 represents a focal length of the second lens 112.

In the conditional expression (4), due to a restriction on the total optical length, when the upper limit is exceeded, a portable use becomes difficult. When the lower limit is exceeded, it is difficult to obtain a manufacturing tolerance, which makes the manufacture impossible. Therefore, the condition in this case is the optimal condition.

[Expression 4]

$$1.2 \leq TT/f \leq 3 \qquad (4)$$

where TT represents a total optical length, and f represents the total focal length.

In the conditional expression (5), which is related to the power of the first group 110, when the lower limit is exceeded, the power is collected forwards, and the pupil position is leaned to the image plane. As a result, it becomes difficult to secure the off-axis characteristics.

When the upper limit is exceeded, in contrast, the pupil position is leaned to the object side. This is advantageous to secure the off-axis characteristics, but the total optical length becomes longer, which spoils merchantability.

[Expression 5]

$$0.6 \leq fg1/f \leq 10 \qquad (5)$$

where f represents the total focal length, and fg1 represents a combined focal length of the first lens 111 and the second lens 112 (focal length of the first group 110).

In the conditional expression (6), which is related to the power of the second group 120, when the lower limit is exceeded, the power of the second group 120 becomes strong, and the power of the first group 110 becomes weak, with the result that the total length becomes long undesirably.

When the upper limit is exceeded, a power allocation is like a telephotographic lens shape, which makes it difficult to secure the off-axis characteristics.

[Expression 6]

$$1.0 \leq fg2/f \leq 100 \quad (6)$$

where f represents the total focal length, and fg2 represents a combined focal length of the third lens 114, the fourth lens 115, and the fifth lens 116 (focal length of the second group 120).

In the conditional expression (7), which is related to the Abbe number $\nu L2$ of the second lens 112, when the lower limit is exceeded, the chromatic aberration is deteriorated, and the entire resolution is lowered.

When the upper limit is exceeded, the cost of a material is increased, which does not serve the purpose of this case.

[Expression 7]

$$40 \leq \nu L2 \leq 70 \quad (7)$$

In the conditional expression (8), which is related to the Abbe number $\nu L3$ of the third lens 114, when the lower limit is exceeded, the cost of a material is increased, which does not serve the purpose of this case.

When the upper limit is exceeded, the chromatic aberration is deteriorated, and the entire resolution is lowered.

[Expression 8]

$$10 \leq \nu L3 \leq 40 \quad (8)$$

In the conditional expression (9), which is related to the Abbe number $\nu L4$ of the fourth lens 115, when the lower limit is exceeded, the chromatic aberration is deteriorated, and the entire resolution is lowered.

When the upper limit is exceeded, the cost of a material is increased, which does not serve the purpose of this case.

[Expression 9]

$$40 \leq \nu L4 \leq 70 \quad (9)$$

In the conditional expression (10), which is related to the Abbe number $\nu L5$ of the fifth lens 116, when the lower limit is exceeded, the cost of a material is increased, which does not serve the purpose of this case.

When the upper limit is exceeded, the chromatic aberration is deteriorated, and the entire resolution is lowered.

[Expression 10]

$$10 \leq \nu L5 \leq 40 \quad (10)$$

The conditional expressions (1) to (10) are common to examples 1, 2, and 3 described below, and are used as appropriate, thereby realizing a compact optical system and a more desirable image forming performance suitable for an individual image pickup sensor or image pickup apparatus.

It should be noted that the shape of an aspheric surface of the lens is expressed by the following expression, with a direction from the object toward the image plane being set as a positive direction.

Aspheric Surface Equation:

$$X = cy^2/1 + \sqrt{1-(1+k)c^2y^2} + Ay^4 + By^6 + Cy^8 + Dy^{10}$$

where k represents a conic coefficient, A, B, C, and D each represent an aspheric surface coefficient, r represents the center curvature radius. Further, y represents the height of a light beam from an optical axis, and c represents an inverse (1/r) of the center curvature radius r.

Furthermore, in the aspheric surface equation, X represents a distance from a tangent plane to the top of the spherical surface, A represents a fourth-degree aspheric surface coefficient, B represents a sixth-degree aspheric surface coefficient, C represents an eighth-degree aspheric surface coefficient, and D represents a tenth-degree aspheric surface coefficient.

Figure 2:
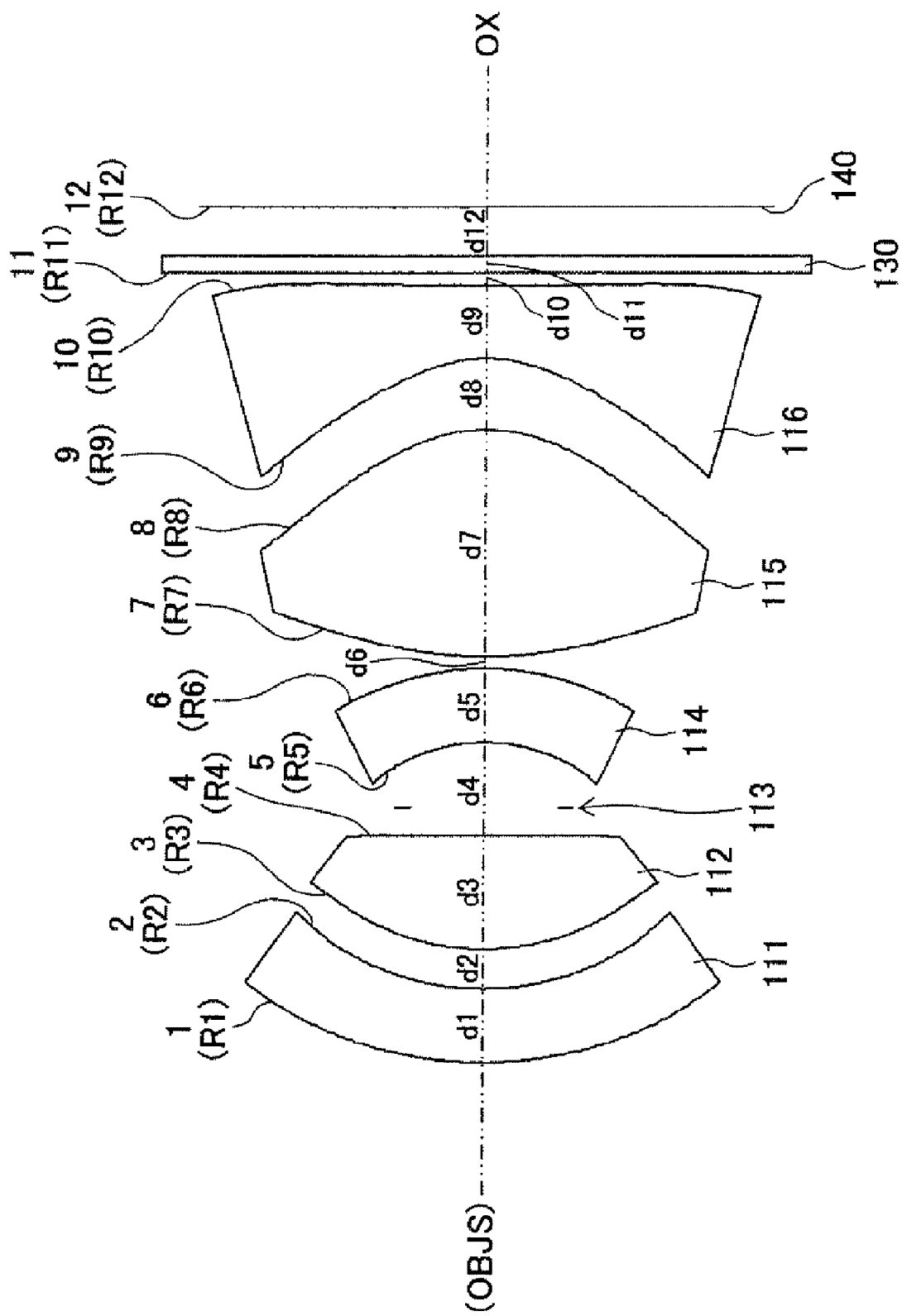
FIG. 2 is a diagram showing surface numbers given to lenses that constitute lens groups of the image pickup lens according to the first embodiment, to a cover glass that forms an image pickup unit, and to an image plane.

FIG. 2 is a diagram showing surface numbers given to the lenses that constitute the lens groups of the image pickup lens according to this embodiment, to the cover glass that forms the image pickup unit, and to the image plane.

It should be noted the diaphragm 113 is not considered in the drawing.

Specifically, the surface numbers of 1 and 2 are given to the object-side surface (convex surface) and the image-plane-side surface of the first lens 111, respectively.

The surface numbers of 3 and 4 are given to the object-side surface and the image-plane-side surface of the second lens 112, respectively.

The surface numbers of 5 and 6 are given to the object-side surface and the image-plane-side surface of the third lens 114, respectively.

The surface numbers of 7 and 8 are given to the object-side surface and the image-plane-side surface of the fourth lens 115, respectively.

The surface numbers of 9 and 10 are given to the object-side surface and the image-plane-side surface of the fifth lens 116, respectively.

The surface number of 11 is given to the object-side surface of the cover glass 130, and the surface number of 12 is given to the image plane 140.

In addition, as shown in FIG. 2, in the image pickup lens 100 according to this embodiment, the center curvature radius of the object-side surface (No. 1) of the first lens 111 is set as R1, and the center curvature radius of the image-plane-side surface thereof is set as R2.

The center curvature radius of the object-side surface of the second lens 112 is set as R3, and the center curvature radius of the image-plane-side surface thereof is set as R4.

The center curvature radius of the object-side surface of the third lens 114 is set as R5, and the center curvature radius of the image-plane-side surface thereof is set as R6.

The center curvature radius of the object-side surface of the fourth lens 115 is set as R7, and the center curvature radius of the image-plane-side surface thereof is set as R8.

The center curvature radius of the object-side surface of the fifth lens 116 is set as R9, and the center curvature radius of the image-plane-side surface thereof is set as R10.

The center curvature radius of an object-side surface 11 of the cover glass 130 is set as R11.

The center curvature radius of a surface 12 of the image plane 140 is set as R12.

It should be noted that the center curvature radius R11 of the surface 11 and the center curvature radius R12 of the surface 12 are infinite (INFINITY).

Further, as shown in FIG. 2, a distance between a surface 1 and a surface 2 on an optical axis OX, which corresponds to the thickness of the first lens 111, is set as d1, and a distance between the image-plane-side surface 2 of the first lens 111 and an object-side surface 3 of the second lens 112 on the optical axis OX is set as d2.

A distance between the surface 3 and a surface 4 on the optical axis OX, which corresponds to the thickness of the second lens 112, is set as d3, and a distance between the image-plane-side surface 4 of the second lens 112 and an object-side surface 5 of the third lens 114 on the optical axis OX is set as d4.

A distance between the surface 5 and a surface 6 on the optical axis OX, which corresponds to the thickness of the third lens 114, is set as d5, and a distance between the image-plane-side surface 6 of the third lens 114 and an object-side surface 7 of the fourth lens 115 on the optical axis OX is set as d6.

A distance between the surface 7 and a surface 8 on the optical axis OX, which corresponds to the thickness of the fourth lens 115, is set as d7, and a distance between the image-plane-side surface 8 of the fourth lens 115 and an object-side surface 9 of the fifth lens 116 on the optical axis OX is set as d8.

A distance between the surface 9 and a surface 10 on the optical axis OX, which corresponds to the thickness of the fifth lens 116, is set as d9, and a distance between the image-plane-side surface 10 of the fifth lens 116 and the object-side surface 11 of the cover glass 130 on the optical axis OX is set as d10.

A distance between the object-side surface 11 and an image-plane-side surface of the cover glass 130 on the optical axis OX, which corresponds to the thickness of the cover glass 130, is set as d11.

A distance between the image-plane-side surface of the cover glass 130 and the surface 12 of the image plane 140 on the optical axis OX is set as d12.

In the following, the examples 1 to 3 will be described. In the examples 1 to 3, shown are design examples of an image pickup lens for a CMOS imager for ¼ size, 1.1 μm pitch, and 8 m.

Hereinafter, the example 1 is shown in which specific numerical values of the image pickup lens are indicated. It should be noted that, in the example 1, the same surface numbers as shown in FIG. 2 are given to the lenses of the image pickup lens 100, to the cover glass 130 that forms the image pickup unit, and the image plane 140.

Example 1

Tables 1, 2, 3, and 4 show numerical values of the example 1. The numerical values of the example 1 correspond to the image pickup lens 100 shown in FIG. 1.

The table 1 shows the curvature radiuses (R: mm), distances (d: mm), refractive indexes (nd), and variance values (vd) of the lenses, the cover glass, and the image plane that correspond to the surface numbers of the image pickup lens in the example 1.

TABLE 1

Example 1, lens structure data

| Surface No. | R | d | nd | vd |
|---|---|---|---|---|
| 1 | 3.308 | 0.600 | 1.632 | 23.0 |
| 2 | 2.202 | 0.320 | | |
| 3 | 1.969 | 0.937 | 1.531 | 56.0 |
| 4 | 250.245 | 0.755 | | |
| 5 | −1.336 | 0.600 | 1.632 | 23.0 |
| 6 | −2.029 | 0.100 | | |
| 7 | 3.296 | 1.857 | 1.531 | 56.0 |
| 8 | −1.204 | 0.586 | | |
| 9 | −1.041 | 0.600 | 1.632 | 23.0 |
| 10 | −1100.000 | 0.100 | | |
| 11 | INFINITY | 0.145 | 1.517 | 64.2 |
| 12 | INFINITY | 0.400 | | |

Table 2 shows fourth-, sixth-, eighth-, and tenth-degree aspheric coefficients of the surfaces 1 and 2 of the first lens 111, the surfaces 3 and 4 of the second lens 112, the surfaces 5 and 6 of the third lens 114, the surfaces 7 and 8 of the fourth lens 115, and the surfaces 9 and 10 of the fifth lens 116 in the example 1.

In the table 2, K represents a conic constant, A represents the fourth-degree aspheric surface coefficient, B represents the sixth-degree aspheric surface coefficient, C represents the eighth-degree aspheric surface coefficient, and D represents the tenth-degree aspheric surface coefficient.

TABLE 2

Example 1, aspheric surface data

| | | | | | |
|---|---|---|---|---|---|
| First surface | K: 0.655 | A: 0.000E+00 | B: 0.000E+00 | C: 0.000E+00 | D: 0.000E+00 |
| Second surface | K: −0.264 | A: −0.123E−02 | B: 0.330E−02 | C: 0.250E−02 | D: −0.607E−03 |
| Third surface | K: −0.748 | A: 0.792E−02 | B: 0.238E−02 | C: 0.141E−01 | D: −0.783E−02 |
| Fourth surface | K: −10.00 | A: 0.126E−02 | B: 0.147E−01 | C: −0.463E−01 | D: 0.228E−01 |
| Fifth surface | K: −1.070 | A: 0.130E−01 | B: −0.478E−01 | C: −0.308E−01 | D: −0.161E−01 |
| Sixth surface | K: −2.009 | A: 0.147E−01 | B: −0.502E−02 | C: −0.101E−01 | D: 0.136E−02 |
| Seventh surface | K: −5.277 | A: −0.176E−02 | B: 0.989E−03 | C: −0.163E−03 | D: 0.339E−04 |
| Eighth surface | K: −2.499 | A: −0.309E−01 | B: 0.610E−02 | C: 0.965E−04 | D: −0.427E−04 |
| Ninth surface | K: −3.09 | A: 0.135E−02 | B: −0.186E−01 | C: 0.781E−02 | D: −0.106E−02 |
| Tenth surface | K: −10.000 | A: 0.206E−01 | B: −0.127E−01 | C: 0.254E−02 | D: −0.200E−03 |

Table 3 specifically shows the focal length f, a numerical aperture F, a half field angle ω, and a lens length H of the image pickup lens 100 in the example 1.

Here, the focal length f is set to 3.68 (mm), the numerical aperture F is set to 2.4, the half field angle ω is set to 32.0 deg, and the lens length H is set to 7.00 (mm).

TABLE 3

Example 1, structure data f (focal length) = 3.68 mm
F (numerical aperture) = 2.4
ω (half field angle) = 32.0 deg
H (total lens length) = 7.00 mm Table 4 shows that the conditional expressions (1) to (10) are satisfied in the example 1.

TABLE 4

Example 1, values of conditional expressions

| Conditional expressions | | Example 1 |
|---|---|---|
| (1) | f4/f | 0.525 |
| (2) | f5/f | −0.443 |
| (3) | f2/f | 1.011 |
| (4) | TT/f | 1.902 |
| (5) | fg1/f | 1.513 |
| (6) | fg2/f | 2.720 |
| (7) | vL2 | 56.0 |
| (8) | vL3 | 23.0 |
| (9) | vL4 | 56.0 |
| (10) | vL5 | 23.0 |

As shown in the table 4, in the example 1, the power f4/f of the fourth lens 115 is set to 0.525, which satisfies the condition defined by the conditional expression (1).

The power f5/f of the fifth lens 116 is set to −0.443, which satisfies the condition defined by the conditional expression (2).

The power f2/f of the second lens 112 is set to 1.011, which satisfies the condition defined by the conditional expression (3).

The limiting condition TT/f to the total optical length TT is set to 1.902, which satisfies the condition defined by the conditional expression (4).

The power fg1/f of the first group 110 is set to 1.513, which satisfies the condition defined by the conditional expression (5).

The power fg2/f of the second group 120 is set to 2.720, which satisfies the condition defined by the conditional expression (6).

The Abbe number vL2 of the second lens 112 is set to 56.0, which satisfies the condition defined by the conditional expression (7).

The Abbe number vL3 of the third lens 114 is set to 23.0, which satisfies the condition defined by the conditional expression (8).

The Abbe number vL4 of the fourth lens 115 is set to 56.0, which satisfies the condition defined by the conditional expression (9).

The Abbe number vL5 of the fifth lens 116 is set to 23.0, which satisfies the condition defined by the conditional expression (10).

Figure 3:
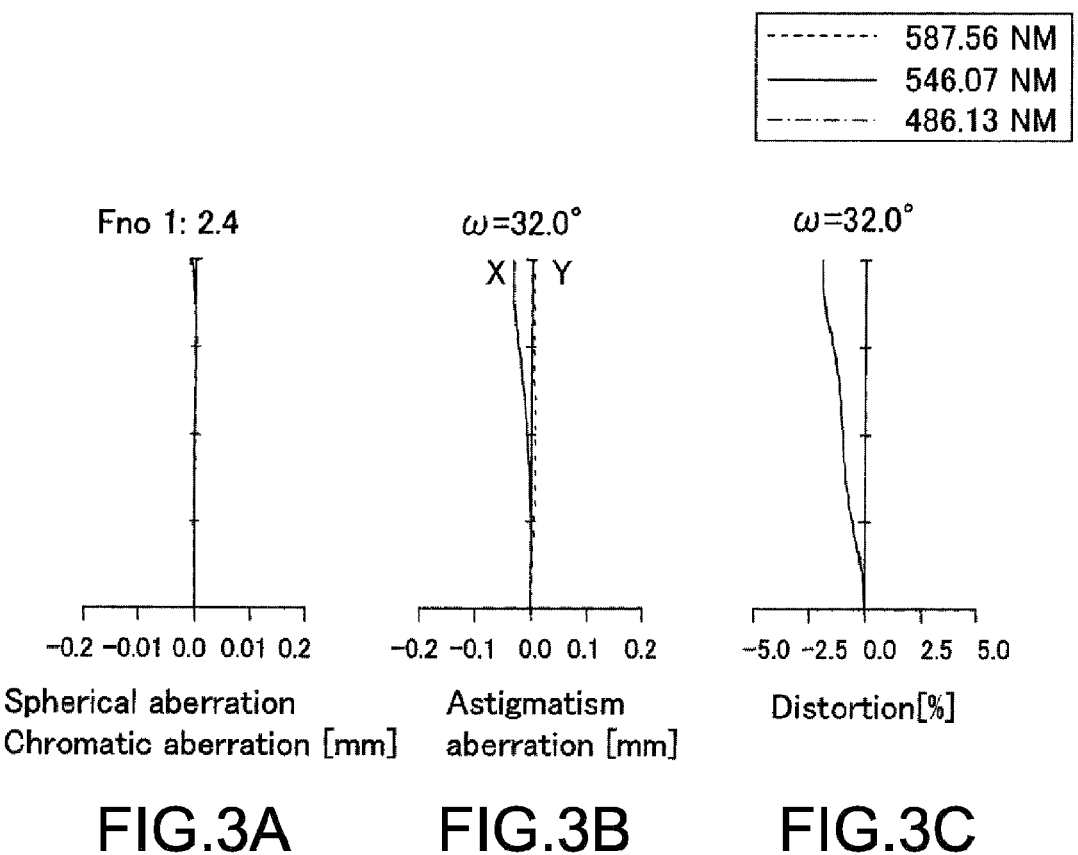
FIG. 3 are aberration diagrams showing a spherical aberration, astigmatism, and distortion, respectively, in an example 1.

FIG. 3 are aberration diagrams showing the spherical aberration (chromatic aberration), the astigmatism, and distortion, respectively, in the example 1. FIG. 3A shows the spherical aberration (chromatic aberration), FIG. 3B shows the astigmatism, and FIG. 3C shows the distortion.

As shown in FIGS. 3A to 3C, according to the example 1, the spherical aberration, the astigmatism, and the distortion are desirably corrected, with the result that an image pickup lens provided with an optical unit that is excellent in image-forming performance is obtained.

2. Second Embodiment

Figure 4:
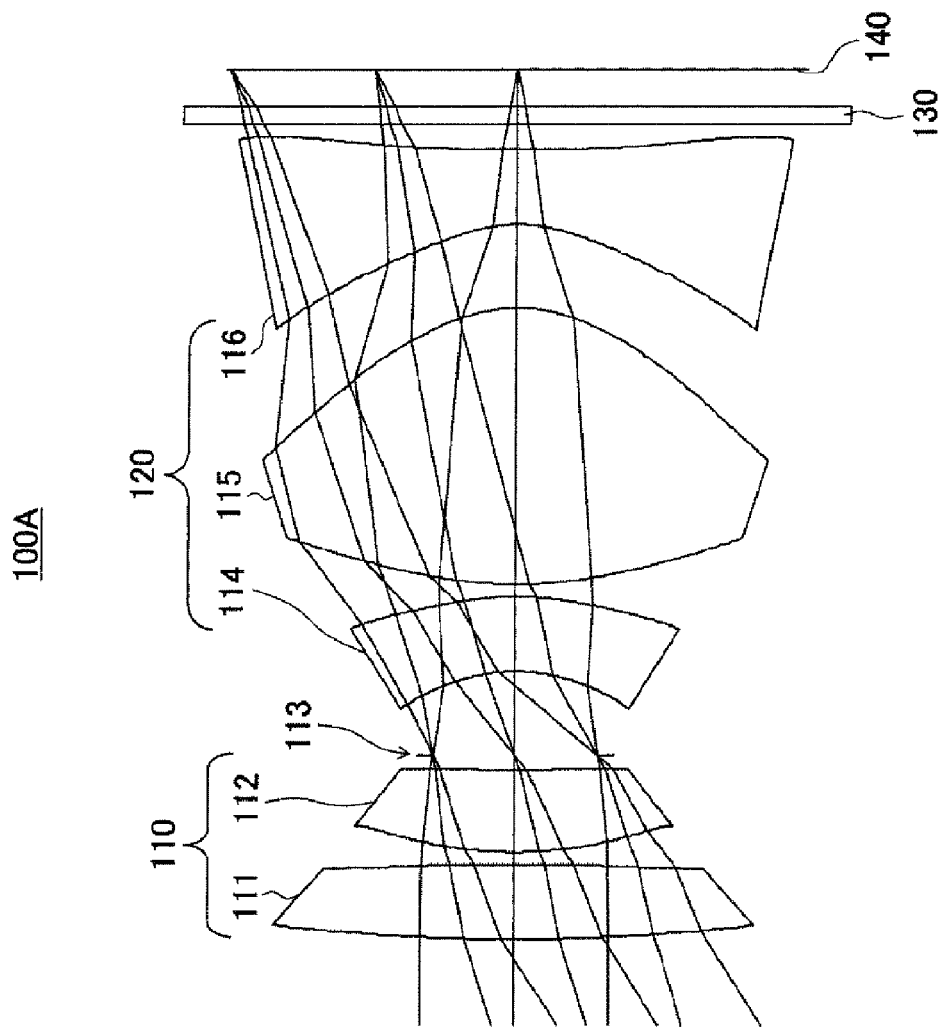
FIG. 4 is a diagram showing a structural example of an image pickup lens according to a second embodiment of the present invention.

FIG. 4 is a diagram showing a structural example of an image pickup lens according to a second embodiment of the present invention.

An image pickup lens 100A shown in FIG. 4 according to the second embodiment basically has the same structure as the image pickup lens 100 according to the first embodiment. As described below as an example 2, only set values such as parameters of the constituents are different.

Therefore, a detailed description of the image pickup lens 100A will be omitted.

The image pickup lens 100A is constituted of lenses with the structure of five elements in five groups.

The first lens 111 is formed of a convex lens having a weak positive power.

The second lens 112 is formed of an approximately convex lens.

The third lens 114 is formed of a negative meniscus lens, the convex shape of which is convex toward the image plane, and an Abbe number vL3 thereof is small.

The fourth lens 115 is formed of a convex lens having a large Abbe number vL4.

The fifth lens 116 is formed of an approximately concave lens having a negative power, and an Abbe number vL5 thereof is small.

The first lens 111 and the second lens 112 constitute the first group 110, and the third lens 114, the fourth lens 115, and the fifth lens 116 constitute the second group 120.

The first group 110 desirably corrects, in particular, an off-axis coma aberration and astigmatism with the first lens 111 having the weak negative power and the approximately convex second lens 112.

The second group 120 is constituted of the lens having the concave shave and the small Abbe number, the lens having the convex shape and the large Abbe number, and the lens having the concave shape and the small Abbe number, and sufficiently corrects the color aberration.

The third lens 114 is bent so that the concave surface thereof is directed toward the diaphragm, and the center of a curvature radius of the surface is located in the vicinity of the diaphragm 113, thereby desirably correcting the coma aberration and the astigmatism.

In addition, the powers of the convex fourth lens 115 and the concave fifth lens 116 are significantly large. Therefore, the chromatic aberration, the astigmatism, and the coma aberration are strongly corrected, thereby providing a lens having Fno 2.4.

In the following, the example 2 is shown in which specific numerical values of the image pickup lens are indicated. It should be noted that in the example 2, the same surface numbers as shown in FIG. 2 are given to the lenses of the image pickup lens 100A, the cover glass 130 that forms the image pickup unit, and the image plane 140.

Example 2

Tables 5, 6, 7, and 8 show numerical values of the example 2. The numerical values of the example 2 correspond to the image pickup lens 100A shown in FIG. 4.

The table 5 shows the curvature radiuses (R: mm), distances (d: mm), refractive indexes (nd), and variance values (vd) of the lenses, the cover glass, and the image plane that correspond to the surface numbers of the image pickup lens in the example 2.

TABLE 5

Example 2, lens structure data

| Surface No. | R | d | nd | vd |
|---|---|---|---|---|
| 1 | 16.806 | 0.600 | 1.531 | 56.0 |
| 2 | −23.094 | 0.100 | | |

TABLE 5-continued

Example 2, lens structure data

| Surface No. | R | d | nd | vd |
|---|---|---|---|---|
| 3 | 3.288 | 0.666 | 1.531 | 56.0 |
| 4 | 20.835 | 0.783 | | |
| 5 | −1.292 | 0.600 | 1.632 | 23.0 |
| 6 | −2.278 | 0.100 | | |
| 7 | 3.353 | 2.227 | 1.531 | 56.0 |
| 8 | −1.19 | 0.680 | | |
| 9 | −1.102 | 0.600 | 1.632 | 23.0 |
| 10 | −1100.000 | 0.200 | | |
| 11 | INFINITY | 0.145 | 1.517 | 64.2 |
| 12 | INFINITY | 0.300 | | |

Table 6 shows fourth-, sixth-, eighth-, and tenth-degree aspheric coefficients of the surfaces 1 and 2 of the first lens 111, the surfaces 3 and 4 of the second lens 112, the surfaces 5 and 6 of the third lens 114, the surfaces 7 and 8 of the fourth lens 115, and the surfaces 9 and 10 of the fifth lens 116 in the example 2.

In the table 6, K represents a conic constant, A represents the fourth-degree aspheric surface coefficient, B represents the sixth-degree aspheric surface coefficient, C represents the eighth-degree aspheric surface coefficient, and D represents the tenth-degree aspheric surface coefficient.

TABLE 6

Example 2, aspheric surface data

| | | | | | |
|---|---|---|---|---|---|
| First surface | K: 6.611 | A: 0.000E+00 | B: 0.000E+00 | C: 0.000E+00 | D: 0.000E+00 |
| Second surface | K: −10.000 | A: −0.594E−02 | B: 0.126E−01 | C: −0.641E−02 | D: 0.107E−02 |
| Third surface | K: −2.697 | A: −0.153E−03 | B: 0.135E−01 | C: −0.144E−02 | D: −0.606E−02 |
| Fourth surface | K: 10.000 | A: −0.155E−01 | B: −0.400E−02 | C: −0.234E−02 | D: −0.124E−01 |
| Fifth surface | K: −1.625 | A: 0.454E−01 | B: −0.503E−01 | C: −0.168E−01 | D: −0.114E−01 |
| Sixth surface | K: −4.194 | A: 0.387E−01 | B: 0.374E−02 | C: −0.155E−01 | D: 0.313E−02 |
| Seventh surface | K: −6.588 | A: −0.381E−03 | B: 0.557E−03 | C: −0.169E−03 | D: 0.196E−04 |
| Eighth surface | K: −2.269 | A: −0.200E−01 | B: 0.149E−02 | C: 0.383E−03 | D: −0.302E−04 |
| Ninth surface | K: −3.713 | A: 0.353E−01 | B: −0.257E−01 | C: 0.656E−02 | D: −0.654E−03 |
| Tenth surface | K: −10.000 | A: 0.439E−01 | B: −0.190E−01 | C: 0.344E−02 | D: −0.255E−03 |

Table 7 specifically shows the focal length f, a numerical aperture F, a half field angle ω, and a lens length H of the image pickup lens 100A in the example 2.

Here, the focal length f is set to 3.69 (mm), the numerical aperture F is set to 2.4, the half field angle ω is set to 32.0 deg, and the lens length H is set to 7.0 (mm).

TABLE 7

Example 2, structure data f (focal length) = 3.69 mm
F (numerical aperture) = 2.4
ω (half field angle) = 32.0 deg
H (total lens length) = 7.0 mm Table 8 shows that the conditional expressions (1) to (10) are satisfied in the example 2.

TABLE 8

Example 2, values of conditional expressions

| | Conditional expressions | Example 2 |
|---|---|---|
| (1) | f4/f | 0.539 |
| (2) | f5/f | −0.468 |
| (3) | f2/f | 1.962 |
| (4) | TT/f | 1.897 |
| (5) | fg1/f | 1.42 |
| (6) | fg2/f | 3.07 |
| (7) | vL2 | 56.0 |
| (8) | vL3 | 23.0 |
| (9) | vL4 | 56.0 |
| (10) | vL5 | 23.0 |

As shown in the table 8, in the example 2, the power f4/f of the fourth lens 115 is set to 0.539, which satisfies the condition defined by the conditional expression (1).

The power f5/f of the fifth lens 116 is set to −0.468, which satisfies the condition defined by the conditional expression (2).

The power f2/f of the second lens 112 is set to 1.962, which satisfies the condition defined by the conditional expression (3).

The limiting condition TT/f to the total optical length TT is set to 1.897, which satisfies the condition defined by the conditional expression (4).

The power fg1/f of the first group 110 is set to 1.420, which satisfies the condition defined by the conditional expression (5).

The power fg2/f of the second group 120 is set to 3.070, which satisfies the condition defined by the conditional expression (6).

The Abbe number vL2 of the second lens 112 is set to 56.0, which satisfies the condition defined by the conditional expression (7).

The Abbe number vL3 of the third lens 114 is set to 23.0, which satisfies the condition defined by the conditional expression (8).

The Abbe number vL4 of the fourth lens 115 is set to 56.0, which satisfies the condition defined by the conditional expression (9).

The Abbe number vL5 of the fifth lens 116 is set to 23.0, which satisfies the condition defined by the conditional expression (10).

Figure 5:
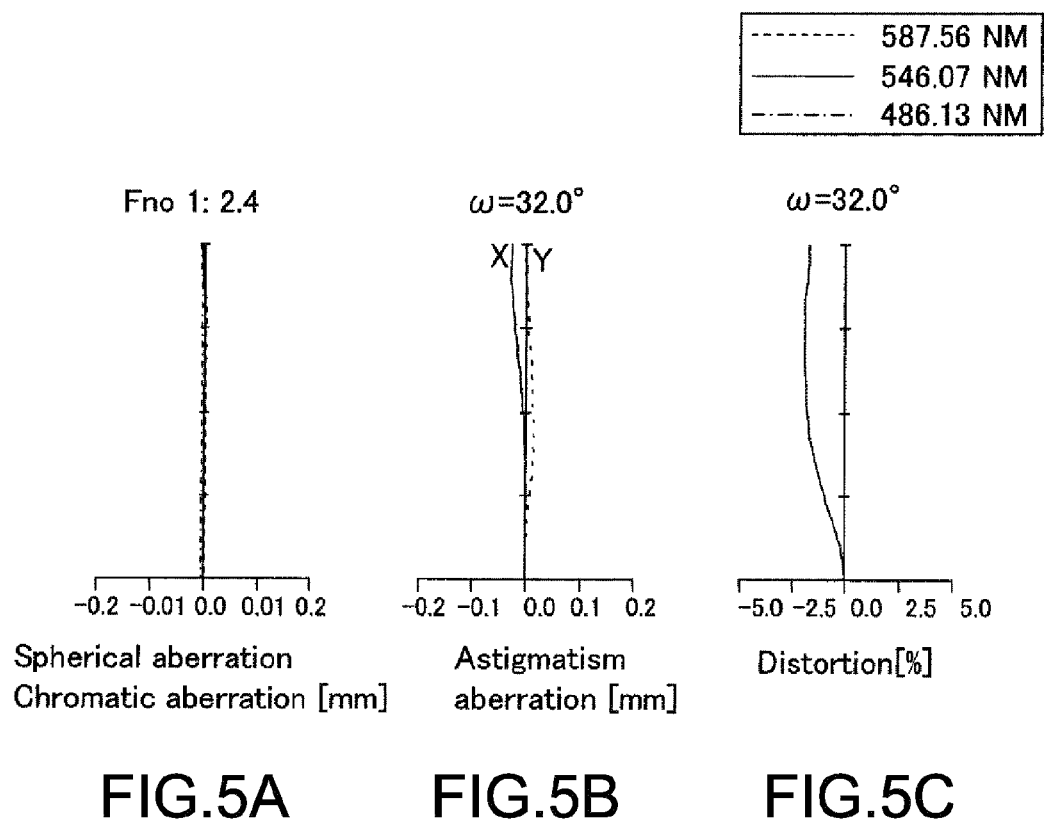
FIG. 5 are aberration diagrams showing a spherical aberration, astigmatism, and distortion, respectively, in an example 2.

FIG. 5 are aberration diagrams showing the spherical aberration (chromatic aberration), the astigmatism, and distortion, respectively, in the example 2. FIG. 5A shows the spherical aberration (chromatic aberration), FIG. 5B shows the astigmatism, and FIG. 5C shows the distortion.

As shown in FIGS. 5A to 5C, according to the example 2, the spherical aberration, the astigmatism, and the distortion are desirably corrected, with the result that an image pickup lens provided with an optical unit that is excellent in image-forming performance is obtained.

3. Third Embodiment

Figure 6:
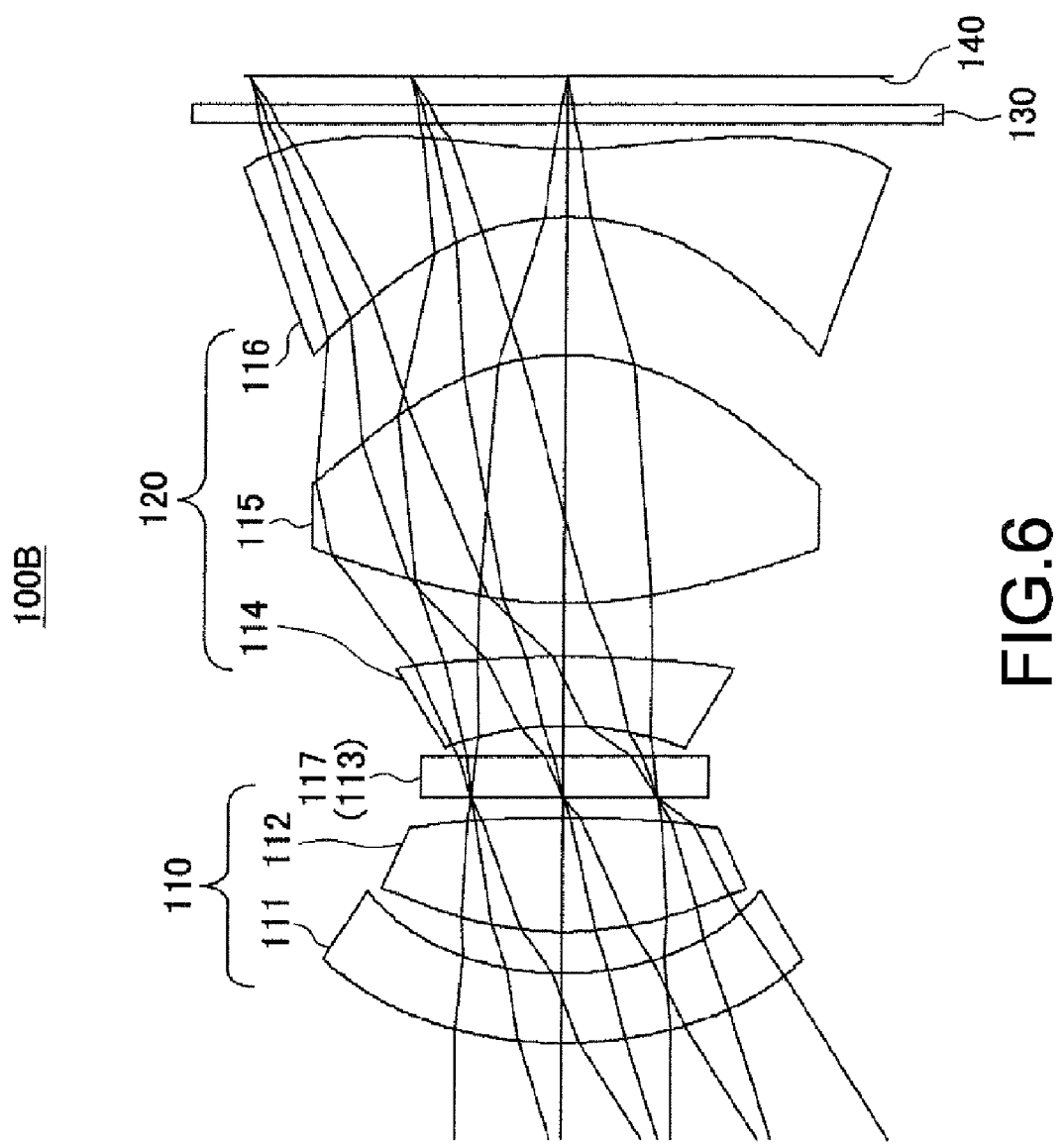
FIG. 6 is a diagram showing a structural example of an image pickup lens according to a third embodiment of the present invention.

FIG. 6 is a diagram showing a structural example of an image pickup lens according to a third embodiment of the present invention.

An image pickup lens 100B shown in FIG. 6 according to the third embodiment basically has the same structure as the image pickup lens 100 according to the first embodiment. However, unlike the image pickup lens 100, the image pickup lens 100B is provided with an optical component 117 having an adjustable diaphragm function at a diaphragm position. Further, as described below as an example 3, set values such as parameters of the constituents are different.

Therefore, a detailed description of the image pickup lens 100B will be omitted.

As the optical component 117, for example, an optical component such as a liquid-crystal adjustable diaphragm, an adjustable diaphragm with a liquid lens, a phase mask that extends a hyperfocal distance, and a coded aperture may be disposed.

Figure 7:
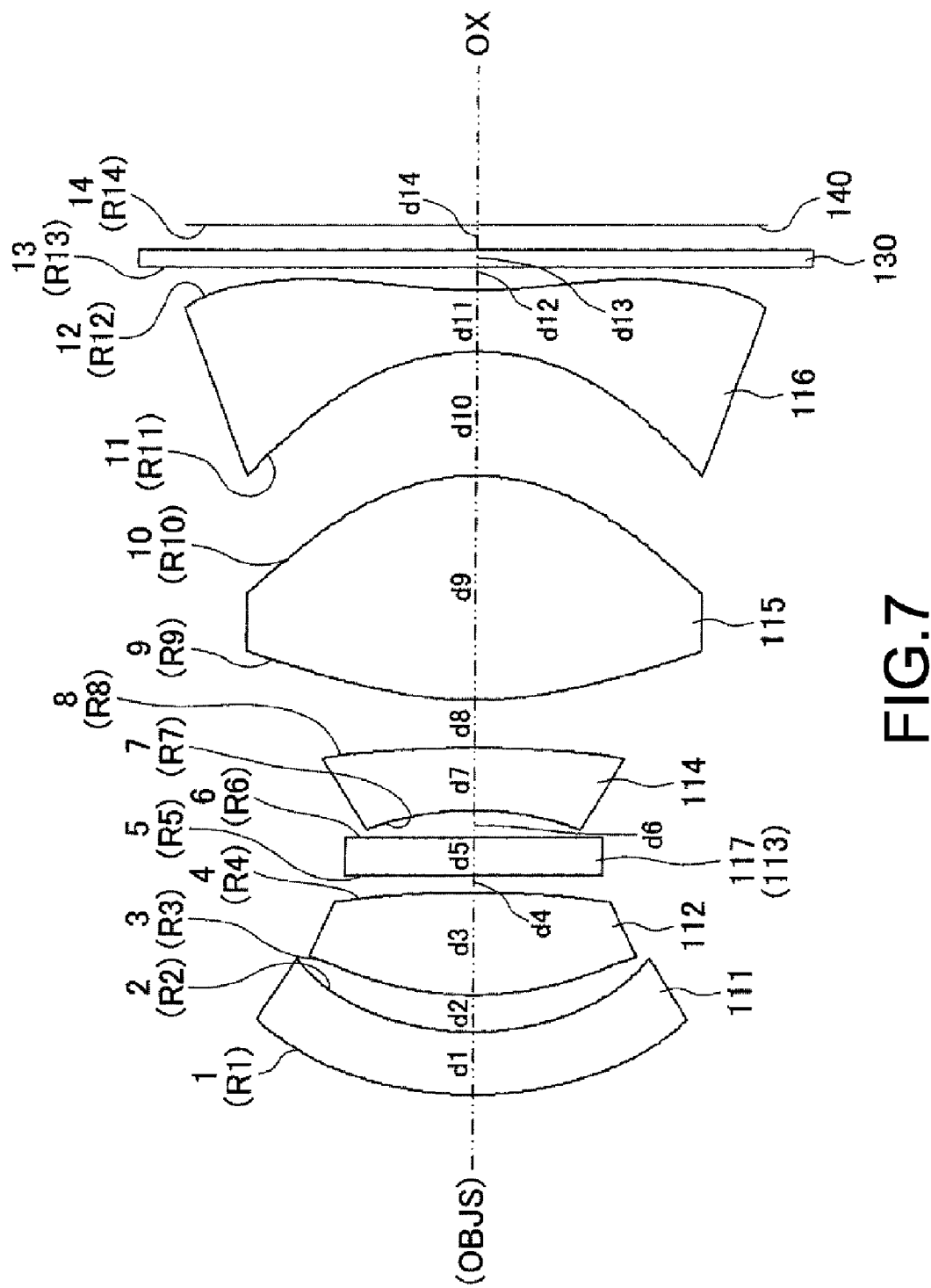
FIG. 7 is a diagram showing surface numbers given to lenses that constitute lens groups of the image pickup lens according to the third embodiment, to a cover glass that forms an image pickup unit, and to an image plane.

FIG. 7 is a diagram showing the surface numbers given to the lenses that constitute the lens groups of the image pickup lens according to this embodiment, to the cover glass that forms the image pickup unit, and to the image plane.

It should be noted that the optical component 117 having the function as the adjustable diaphragm is taken into consideration in this case. Accordingly, the surface numbers given to the lenses and the like from the optical component 117 toward the image plane are different from those of FIG. 2.

Specifically, the surface numbers of 1 and 2 are given to the object-side surface (convex surface) and the image-plane-side surface of the first lens 111, respectively.

The surface numbers of 3 and 4 are given to the object-side surface and the image-plane-side surface of the second lens 112, respectively.

The surface numbers of 5 and 6 are given to an object-side surface and an image-plane-side surface of the optical component 117, respectively.

The surface numbers of 7 and 8 are given to the object-side surface and the image-plane-side surface of the third lens 114, respectively.

The surface numbers of 9 and 10 are given to the object-side surface and the image-plane-side surface of the fourth lens 115, respectively.

The surface numbers of 11 and 12 are given to the object-side surface and the image-plane-side surface of the fifth lens 116, respectively.

The surface number of 13 is given to the object-side surface of the cover glass 130, and the surface number of 14 is given to the image plane 140.

In addition, as shown in FIG. 7, in the image pickup lens 100B according to this embodiment, the center curvature radius of the object-side surface (No. 1) of the first lens 111 is set as R1, and the center curvature radius of the image-plane-side surface thereof is set as R2.

The center curvature radius of the object-side surface of the second lens 112 is set as R3, and the center curvature radius of the image-plane-side surface thereof is set as R4.

The center curvature radius of the object-side surface of the optical component 117 is set as R5, and the center curvature radius of the image-plane-side surface thereof is set as R6.

The center curvature radius of the object-side surface of the third lens 114 is set as R7, and the center curvature radius of the image-plane-side surface thereof is set as R8.

The center curvature radius of the object-side surface of the fourth lens 115 is set as R9, and the center curvature radius of the image-plane-side surface thereof is set as R10.

The center curvature radius of the object-side surface of the fifth lens 116 is set as R11, and the center curvature radius of the image-plane-side surface thereof is set as R12.

The center curvature radius of an object-side surface 13 of the cover glass 130 is set as R13.

The center curvature radius of a surface 14 of the image plane 140 is set as R14.

It should be noted that the center curvature radius R5 of the surface 5 of and the center curvature radius R6 of the surface 6 of the optical component 117 and the center curvature radius R13 of the surface 13 and the center curvature radius R14 of the surface 14 are infinite (INFINITY).

Further, as shown in FIG. 7, a distance between the surface 1 and the surface 2 on the optical axis OX, which corresponds to the thickness of the first lens 111, is set as d1, and a distance between the image-plane-side surface 2 of the first lens 111 and the object-side surface 3 of the second lens 112 on the optical axis OX is set as d2.

A distance between the surface 3 and the surface 4 on the optical axis OX, which corresponds to the thickness of the second lens 112, is set as d3, and a distance between the image-plane-side surface 4 of the second lens 112 and the object-side surface 5 of the optical component 117 on the optical axis OX is set as d4.

A distance between the surface 5 and the surface 6 on the optical axis OX, which corresponds to the thickness of the optical component 117, is set as d5, and a distance between the image-plane-side surface 6 of the optical component 117 and an object-side surface 7 of the third lens 114 on the optical axis OX is set as d6.

A distance between the surface 7 and the surface 8 on the optical axis OX, which corresponds to the thickness of the third lens 114, is set as d7, and a distance between the image-plane-side surface 8 of the third lens 114 and the object-side surface 9 of the fourth lens 115 on the optical axis OX is set as d8.

A distance between the surface 9 and the surface 10 on the optical axis OX, which corresponds to the thickness of the fourth lens 115, is set as d9, and a distance between the image-plane-side surface 10 of the fourth lens 115 and the object-side surface 11 of the fifth lens 116 on the optical axis OX is set as d10.

A distance between the surface 11 and the surface 12 on the optical axis OX, which corresponds to the thickness of the fifth lens 116, is set as d11, and a distance between the image-plane-side surface 12 of the fifth lens 116 and the object-side surface 13 of the cover glass 130 on the optical axis OX is set as d12.

A distance between the object-side surface 13 and an image-plane-side surface on the optical axis OX, which corresponds to the thickness of the cover glass 130, is set as d13.

A distance between the image-plane-side surface of the cover glass 130 and the surface 14 of the image plane 140 on the optical axis OX is set as d14.

Hereinafter, the example 3 is shown in which specific numerical values of the image pickup lens are indicated. It should be noted that in the example 3, the surface numbers as shown in FIG. 7 are given to the lens elements and the cover glass 130 that forms the image pickup unit, a buffer layer, and a glass substrate (transparent member) of the image pickup lens 100B.

Example 3

Tables 9, 10, 11, and 12 show numerical values of the example 3. The numerical values of the example 3 correspond to the image pickup lens 100B shown in FIG. 7.

The table 9 shows the curvature radiuses (R: mm), distances (d: mm), refractive indexes (nd), and variance values (vd) of the lenses, the cover glass, and the image plane that correspond to the surface numbers of the image pickup lens in the example 3.

TABLE 9

Example 3, lens structure data

| Surface No. | R | d | nd | vd |
|---|---|---|---|---|
| 1 | 3.166 | 0.500 | 1.531 | 56.0 |
| 2 | 2.18 | 0.302 | | |
| 3 | 2.636 | 0.828 | 1.531 | 56.0 |
| 4 | −8.016 | 0.137 | | |
| 5 | INFINITY | 0.300 | 1.517 | 64.2 |
| 6 | INFINITY | 0.229 | | |
| 7 | −2.158 | 0.500 | 1.632 | 23.0 |
| 8 | −7.664 | 0.381 | | |
| 9 | 2.871 | 1.799 | 1.531 | 56.0 |
| 10 | −1.574 | 1.000 | | |
| 11 | −1.865 | 0.500 | 1.632 | 23.0 |
| 12 | 3.890 | 0.180 | | |
| 13 | INFINITY | 0.145 | 1.517 | 64.2 |
| 14 | INFINITY | 0.200 | | |

Table 10 shows fourth-, sixth-, eighth-, and tenth-degree aspheric coefficients of the surfaces 1 and 2 of the first lens 111, the surfaces 3 and 4 of the second lens 112, the surfaces 7 and 8 of the third lens 114, the surfaces 9 and 10 of the fourth lens 115, and the surfaces 11 and 12 of the fifth lens 116 in the example 3.

In the table 10, K represents a conic constant, A represents the fourth-degree aspheric surface coefficient, B represents the sixth-degree aspheric surface coefficient, C represents the eighth-degree aspheric surface coefficient, and D represents the tenth-degree aspheric surface coefficient.

TABLE 10

Example 3, aspheric surface data

| | | | | | |
|---|---|---|---|---|---|
| First surface | K: 1.586 | A: 0.000E+00 | B: 0.000E+00 | C: 0.000E+00 | D: 0.000E+00 |
| Second surface | K: −0.488 | A: 0.916E−02 | B: 0.569E−02 | C: 0.125E−02 | D: 0.861E−03 |
| Third surface | K: −1.307 | A: 0.491E−02 | B: 0.175E−02 | C: 0.634E−02 | D: −0.583E−02 |
| Fourth surface | K: −10.000 | A: 0.891E−02 | B: 0.233E−02 | C: −0.311E−01 | D: 0.153E−01 |
| Seventh surface | K: −5.622 | A: 0.759E−02 | B: −0.476E−01 | C: 0.248E−01 | D: −0.387E−01 |
| Eighth surface | K: −8.067 | A: 0.334E−01 | B: −0.249E−01 | C: 0.702E−02 | D: −0.373E−02 |
| Ninth surface | K: −6.479 | A: −0.297E−02 | B: 0.711E−04 | C: 0.305E−03 | D: −0.299E−04 |
| Tenth surface | K: −1.758 | A: −0.736E−02 | B: −0.379E−02 | C: 0.112E−02 | D: −0.353E−05 |
| Eleventh surface | K: −0.607 | A: −0.276E−01 | B: 0.515E−02 | C: 0.287E−02 | D: −0.684E−03 |
| Twelfth surface | K: −10.000 | A: −0.402E−01 | B: 0.562E−02 | C: −0.318E−04 | D: −0.658E−04 |

Table 11 specifically shows the focal length f, a numerical aperture F, a half field angle ω, and a lens length H of the image pickup lens 100B in the example 3.

Here, the focal length f is set to 3.64 (mm), the numerical aperture F is set to 2.4, the half field angle ω is set to 32.2 deg, and the lens length H is set to 7.00 (mm).

TABLE 11

Example 3, structure data f (focal length) = 3.64 mm
F (numerical aperture) = 2.4
ω (half field angle) = 32.2 deg
H (total lens length) = 7.00 mm Table 12 shows that the conditional expressions (1) to (10) are satisfied in the example 3.

TABLE 12

Example 3, values of conditional expressions

| Conditional expressions | | Example 3 |
|---|---|---|
| (1) | f4/f | 0.611 |
| (2) | f5/f | −0.524 |
| (3) | f2/f | 1.052 |
| (4) | TT/f | 1.923 |
| (5) | fg1/f | 1.436 |
| (6) | fg2/f | 10.071 |
| (7) | vL2 | 56.0 |
| (8) | vL3 | 23.0 |
| (9) | vL4 | 56.0 |
| (10) | vL5 | 23.0 |

As shown in the table 12, in the example 3, the power f4/f of the fourth lens 115 is set to 0.611, which satisfies the condition defined by the conditional expression (1).

The power f5/f of the fifth lens 116 is set to −0.524, which satisfies the condition defined by the conditional expression (2).

The power f2/f of the second lens 112 is set to 1.052, which satisfies the condition defined by the conditional expression (3).

The limiting condition TT/f to the total optical length TT is set to 1.923, which satisfies the condition defined by the conditional expression (4).

The power fg1/f of the first group 110 is set to 1.436, which satisfies the condition defined by the conditional expression (5).

The power fg2/f of the second group 120 is set to 10.071, which satisfies the condition defined by the conditional expression (6).

The Abbe number vL2 of the second lens 112 is set to 56.0, which satisfies the condition defined by the conditional expression (7).

The Abbe number vL3 of the third lens 114 is set to 23.0, which satisfies the condition defined by the conditional expression (8).

The Abbe number vL4 of the fourth lens 115 is set to 56.0, which satisfies the condition defined by the conditional expression (9).

The Abbe number vL5 of the fifth lens 116 is set to 23.0, which satisfies the condition defined by the conditional expression (10).

Figure 8:
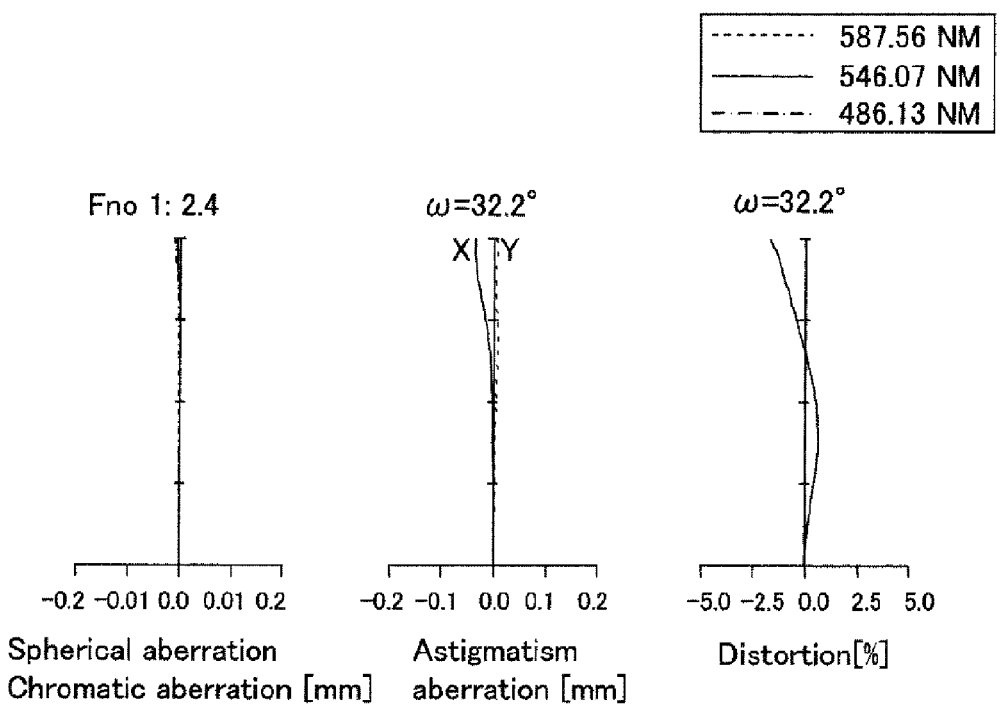
FIG. 8 are aberration diagrams showing a spherical aberration, astigmatism, and distortion, respectively, in an example 3.

FIG. 8 are aberration diagrams showing the spherical aberration (chromatic aberration), the astigmatism, and distortion, respectively in the example 3. FIG. 8A shows the spherical aberration (chromatic aberration), FIG. 8B shows the astigmatism, and FIG. 8C shows the distortion.

As shown in FIGS. 8A to 8C, according to the example 3, the spherical aberration, the astigmatism, and the distortion are desirably corrected, with the result that an image pickup lens provided with an optical unit that is excellent in image-forming performance is obtained.

According to this embodiment described above, the following effect can be obtained.

With the image pickup lens 100B of this embodiment, it is possible to provide an optical apparatus that has optical characteristics that are equal to or greater than those of an optical apparatus in related art, delivers brighter light, and is capable of being downsized.

In the structure of five elements in five groups, which is divided into the first group and the second group by the diaphragm, the first group 110 is constituted of two lenses, i.e., the first lens 111 and the second lens 112. With the first and second lenses 111 and 112, the correction of the off-axis aberration can be strongly performed.

In the second group 120, the third lens 114 is bent so that the curvature center of the lens is located in the vicinity of the diaphragm, with the result that the off-axis coma aberration and astigmatism can be performed.

In addition, with the largely convex fourth lens 115 and the largely concave fifth lens 116, the correction of the chromatic aberration, the coma aberration, and the astigmatism can be strongly performed.

Those five lenses can be formed of plastic-molded lenses.

With those lenses, it is possible to implement a significantly high-performance optical unit that delivers bright light, has a wide angle, has a short optical path length, and is compact. Further, the optical unit is inexpensive and provides high productivity.

The image pickup lenses 100, 100A, and 100B having the characteristics described above can be applied as a lens for a digital camera that uses an image sensor such as a CCD and a CMOS sensor, in particular, a lens for a camera that is mounted on a small electronic apparatus such as a mobile phone.

4. Fourth Embodiment

Figure 9:
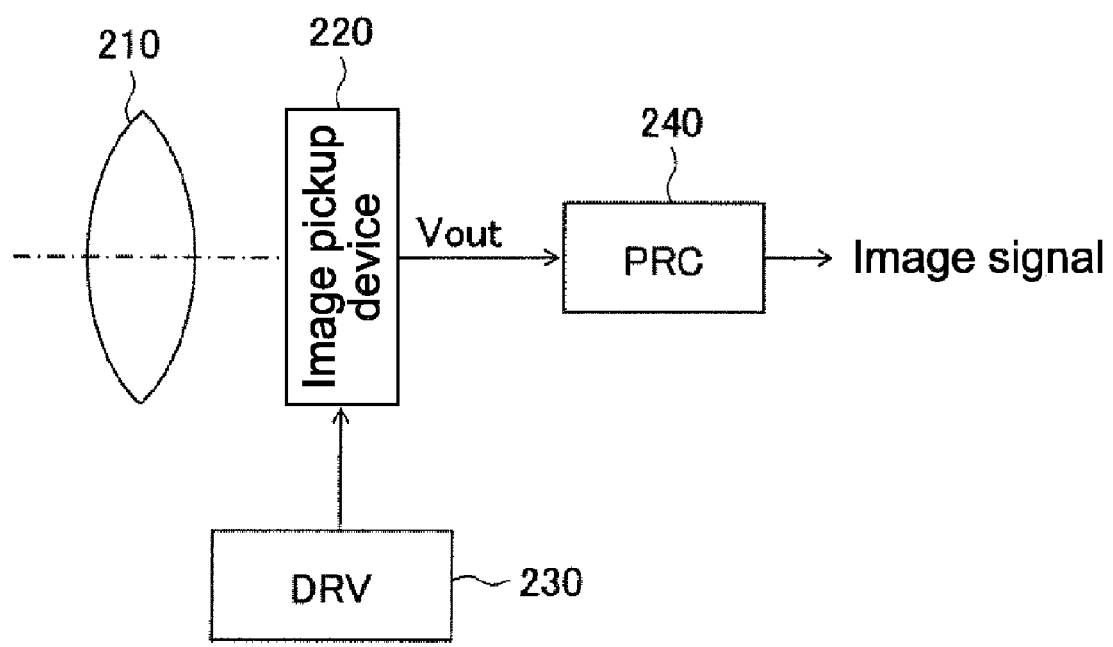
FIG. 9 is a block diagram showing a structural example of an image pickup apparatus that uses an image pickup lens including an optical unit according to a fourth embodiment.

FIG. 9 is a block diagram showing a structural example of an image pickup apparatus that uses an image pickup lens including an optical unit according to this embodiment.

As shown in FIG. 9, an image pickup apparatus 200 includes an optical system 210 and an image pickup device 220 according to this embodiment. To the optical system 210, the image pickup lens 100, 100A, or 100B is applied. To the image pickup device 220, a CCD or a CMOS image sensor (solid-state image sensor) can be applied.

The optical system 210 guides incident light to an image pickup surface including a pixel area of the image pickup device 220, and forms an image of a subject thereon.

The image pickup apparatus 200 further includes a drive circuit (DRV) 230 that drives the image pickup device 220 and a signal processing circuit (PRC) 240 that processes an output signal from the image pickup device 220.

The drive circuit 230 includes a timing generator (not shown) that generates various timing signals including a clock pulse and a start pulse for driving a circuit in the image pickup device 220, and drives the image pickup device 220 with a predetermined timing signal.

In addition, the signal processing circuit 240 performs a predetermined signal processing with respect to the output signal from the image pickup device 220.

An image signal that is processed by the signal processing circuit 240 is recorded on a recording medium such as a memory. A hard copy of the image information recorded on the recording medium is obtained with a printer or the like.

Further, the image signal processed by the signal processing circuit 240 is displayed as a moving image on a monitor formed of a liquid crystal display or the like.

As described above, as the optical system 210, the image pickup lens 100, 100A, or 100B is mounted on the image pickup apparatus such as a digital still camera, with the result that a high-precision camera with low power consumption can be implemented.

The present application contains subject matter related to that disclosed in Japanese Priority Patent Application JP 2009-291916 filed in the Japan Patent Office on Dec. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit, comprising:
a first lens;
a second lens having a convex shape;
a diaphragm;
a third lens having a meniscus shape;
a fourth lens having a convex shape; and
a fifth lens having a negative power,
wherein,
the first lens, the second lens, the diaphragm, the third lens, the fourth lens, and the fifth lens are arranged in the stated order from an object side to an image plane side, and
the fourth lens and the fifth lens satisfy the following conditional expressions (1) and (2), $$0.3 \leq f4/f \leq 10 \quad (1)$$

$$-10 \leq f5/f \leq -0.3 \quad (2)$$

where f represents a total focal length, f4 represents a focal length of the fourth lens, and f5 represents a focal length of the fifth lens.

2. An optical unit, comprising:
a first lens;
a second lens having a convex shape;
a diaphragm;
a third lens having a meniscus shape;
a fourth lens having a convex shape; and
a fifth lens having a negative power,
wherein,
the first lens, the second lens, the diaphragm, the third lens, the fourth lens, and the fifth lens are arranged in the stated order from an object side to an image plane side, and
the second lens satisfies the following conditional expression (3), $$0.3 \leq f2/f \leq 10 \quad (3)$$

where f represents a total focal length, and f2 represents a focal length of the second lens.

3. An optical unit, comprising:
a first lens;
a second lens having a convex shape;
a diaphragm;
a third lens having a meniscus shape;
a fourth lens having a convex shape; and
a fifth lens having a negative power, wherein,
the first lens, the second lens, the diaphragm, the third lens, the fourth lens, and the fifth lens are arranged in the stated order from an object side to an image plane side, and
a total optical length satisfies the following conditional expression (4), $$1.2 \leq TT/f \leq 3 \qquad (4)$$

where f represents a total focal length, and TT represents the total optical length.

4. An optical unit, comprising:
a first lens;
a second lens having a convex shape;
a diaphragm;
a third lens having a meniscus shape;
a fourth lens having a convex shape; and
a fifth lens having a negative power,
wherein,
the first lens, the second lens, the diaphragm, the third lens, the fourth lens, and the fifth lens are arranged in the stated order from an object side to an image plane side,
the first lens and the second lens constitute a first group,
the third lens, the fourth lens, and the fifth lens constitute a second group, and
the first group and the second group satisfy the following conditional expressions (5) and (6), $$0.6 \leq fg1/f \leq 10 \qquad (5)$$

$$1.0 \leq fg2/f \leq 100 \qquad (6)$$

where f represents a total focal length, fg1 represents a combined focal length of the first lens and the second lens, and fg2 represents a combined focal length of the third lens, the fourth lens, and the fifth lens.

5. An optical unit, comprising:
a first lens;
a second lens having a convex shape;
a diaphragm;
a third lens having a meniscus shape;
a fourth lens having a convex shape; and
a fifth lens having a negative power,
wherein,
the first lens, the second lens, the diaphragm, the third lens, the fourth lens, and the fifth lens are arranged in the stated order from an object side to an image plane side, and
the second lens, the third lens, the fourth lens, and the fifth lens have Abbe numbers of vL2, vL3, vL4, and vL5, respectively, which satisfy the following conditional expressions (7), (8), (9), and (10), $$40 \leq vL2 \leq 70 \qquad (7)$$

$$10 \leq vL3 \leq 40 \qquad (8)$$

$$40 \leq vL4 \leq 70 \qquad (9)$$

$$10 \leq vL5 \leq 40 \qquad (10).$$

6. The optical unit according to any of claims 1-5, wherein, between the second lens and the third lens, an adjustable diaphragm is provided.

7. The optical unit according any of claims 1-5, wherein, between the second lens and the third lens, means for increasing a depth of field is provided.

8. An image pickup apparatus, comprising:
an image pickup element; and
an optical unit to form an image of a subject on the image pickup element, the optical unit including
a first lens,
a second lens having a convex shape,
a diaphragm,
a third lens having a meniscus shape,
a fourth lens having a convex shape, and
a fifth lens having a negative power,
wherein,
the first lens, the second lens, the diaphragm, the third lens, the fourth lens, and the fifth lens are arranged in the stated order from an object side to an image plane side, and
the fourth lens and the fifth lens satisfy the following conditional expressions (1) and (2), $$0.3 \leq f4/f \leq 10 \qquad (1)$$

$$-10 \leq f5/f \leq -0.3 \qquad (2)$$

where f represents a total focal length, f4 represents a focal length of the fourth lens, and f5 represents a focal length of the fifth lens.

9. An image pickup apparatus, comprising:
an image pickup element; and
an optical unit to form an image of a subject on the image pickup element, the optical unit including
a first lens,
a second lens having a convex shape,
a diaphragm,
a third lens having a meniscus shape,
a fourth lens having a convex shape, and
a fifth lens having a negative power,
wherein,
the first lens, the second lens, the diaphragm, the third lens, the fourth lens, and the fifth lens are arranged in the stated order from an object side to an image plane side, and
the second lens satisfies the following conditional expression (3), $$0.3 \leq f2/f \leq 10 \qquad (3)$$

where f represents a total focal length, and f2 represents a focal length of the second lens.

10. An image pickup apparatus, comprising:
an image pickup element; and
an optical unit to form an image of a subject on the image pickup element, the optical unit including
a first lens,
a second lens having a convex shape,
a diaphragm,
a third lens having a meniscus shape,
a fourth lens having a convex shape, and
a fifth lens having a negative power,
wherein,
the first lens, the second lens, the diaphragm, the third lens, the fourth lens, and the fifth lens are arranged in the stated order from an object side to an image plane side, and
a total optical length satisfies the following conditional expression (4), $$1.2 \leq TT/f \leq 3 \qquad (4)$$

where f represents a total focal length, and TT represents the total optical length.

11. An image pickup apparatus, comprising:
an image pickup element; and
an optical unit to form an image of a subject on the image pickup element, the optical unit including
a first lens,
a second lens having a convex shape,
a diaphragm,
a third lens having a meniscus shape,
a fourth lens having a convex shape, and
a fifth lens having a negative power,
wherein,
the first lens, the second lens, the diaphragm, the third lens, the fourth lens, and the fifth lens are arranged in the stated order from an object side to an image plane side,
the first lens and the second lens constitute a first group,
the third lens, the fourth lens, and the fifth lens constitute a second group, and
the first group and the second group satisfy the following conditional expressions (5) and (6), $$0.6 \leq fg1/f \leq 10 \quad (5)$$

$$1.0 \leq fg2/f \leq 100 \quad (6)$$

where f represents a total focal length, fg1 represents a combined focal length of the first lens and the second lens, and fg2 represents a combined focal length of the third lens, the fourth lens, and the fifth lens.

12. An image pickup apparatus, comprising:
an image pickup element; and
an optical unit to form an image of a subject on the image pickup element, the optical unit including
a first lens,
a second lens having a convex shape,
a diaphragm,
a third lens having a meniscus shape,
a fourth lens having a convex shape, and
a fifth lens having a negative power,
wherein,
the first lens, the second lens, the diaphragm, the third lens, the fourth lens, and the fifth lens are arranged in the stated order from an object side to an image plane side, and
the second lens, the third lens, the fourth lens, and the fifth lens have Abbe numbers of vL2, vL3, vL4, and vL5, respectively, which satisfy the following conditional expressions (7), (8), (9), and (10), $$40 \leq vL2 \leq 70 \quad (7)$$

$$10 \leq vL3 \leq 40 \quad (8)$$

$$40 \leq vL4 \leq 70 \quad (9)$$

$$10 \leq vL5 \leq 40 \quad (10).$$

* * * * *